US008251360B2

(12) United States Patent
Mori

(10) Patent No.: US 8,251,360 B2
(45) Date of Patent: Aug. 28, 2012

(54) SHEET HANDLING DEVICE/METHOD WITH MULTIPLE CONTROL

(75) Inventor: Takao Mori, Kanagawa-ken (JP)

(73) Assignee: Kabushiki Kaisha Toshiba, Osaka (JP)

( * ) Notice: Subject to any disclaimer, the term of this patent is extended or adjusted under 35 U.S.C. 154(b) by 224 days.

(21) Appl. No.: 12/711,584

(22) Filed: Feb. 24, 2010

(65) Prior Publication Data

US 2010/0217432 A1 Aug. 26, 2010

(30) Foreign Application Priority Data

Feb. 24, 2009 (JP) ................................ 2009-041113

(51) Int. Cl.
*B65G 43/08* (2006.01)

(52) U.S. Cl. ............... 270/52.04; 270/52.01; 270/58.01; 270/52.02; 700/223; 194/302; 194/205

(58) Field of Classification Search ............... 270/52.01, 270/52.02, 52.04, 58.01; 700/223, 224, 225, 700/226; 194/302, 205
See application file for complete search history.

(56) References Cited

U.S. PATENT DOCUMENTS 6,640,156 B1 * 10/2003 Brooks et al. ................ 700/213
6,907,711 B2 * 6/2005 Ishii et al. ......................... 53/54
7,152,744 B2 * 12/2006 Kunz et al. .................... 209/534
7,380,387 B2 * 6/2008 Ishii et al. ....................... 53/116
7,694,877 B2 * 4/2010 Hemming et al. ............ 235/379
7,706,007 B2 * 4/2010 Crawford et al. ............ 358/1.15
7,769,932 B2 * 8/2010 Nichols ......................... 710/107
7,791,741 B2 * 9/2010 Hindi et al. .................... 358/1.1
7,873,962 B2 * 1/2011 Crawford et al. ............. 718/106
2005/0060061 A1 * 3/2005 Jones et al. ................... 700/226
2008/0177420 A1 * 7/2008 Klein et al. ................... 700/224

FOREIGN PATENT DOCUMENTS

JP 6162324 A 6/1994
JP 2009-102125 A 5/2009
WO WO 00/57367 9/2000

OTHER PUBLICATIONS

European Search Report dated Aug. 17, 2011.

* cited by examiner

*Primary Examiner* — Patrick Mackey
(74) *Attorney, Agent, or Firm* — Pillsbury Winthrop Shaw Pittman, LLP

(57) ABSTRACT

A sheet handling apparatus is presented that includes a first module arranged along a sheet conveyance route from the upstream to the downstream thereof, and a second module arranged adjacent to the first module. The first module includes a first control part to transmit destination information and category information of discriminated sheets and to execute conveyance control to the sheet residing along the first conveyance route. The second module includes a second control part to execute conveyance control to the sheets residing along the second conveyance route, and to transmit information of the number of sheets in each category stacked in the first stacking device. The first control part is configured to execute a cross-check to determine whether the information of the number of sheets in each category received from the second control part matches the information of the number of sheets transmitted to the second control part.

20 Claims, 5 Drawing Sheets

SHEET HANDLING DEVICE/METHOD WITH MULTIPLE CONTROL

CROSS-REFERENCE TO RELATED APPLICATION

This application is based upon and claims the benefit of priority from Japanese Patent Application No. 2009-041113, filed on Feb. 24, 2009, the entire contents of all of which are incorporated herein by reference.

TECHNICAL FIELD

The present invention relates to an apparatus and a method to handle sheets such as securities. Particularly, the present invention relates to a sheet handling apparatus accompanying a long conveyance route to execute conveyance control of sheet by multiple CPUs (Central Processing Unit) and the handling method.

BACKGROUND

The sheet handling apparatus which handles sheets, such as negotiable securities, takes out those sheets one by one from a bundle of multiple sheets, for example, one thousand sheets using a sheet take-out device, sends out the sheets to the conveyance route and conveys the sheets at a predetermined pitch. Then the sheet handling apparatus discriminates kinds of conveyed sheets, for example the classification of negotiable securities and quality state, for example discrimination of genuine sheet, mutilated sheet, rejectable sheet, etc., are discriminated with a discriminating device, and appoints destination for every classification and for every quality.

Based on the discrimination result of sheets, the conveyance control part makes the sheets to be conveyed to their appointed destinations by controlling sorting gates arranged along the conveyance route. The conveyed sheets are stacked in the stacking devices provided to the terminations of individual branch conveyance routes. An impeller type stacking device is used for the stacking device as a measure of stacking, while absorbing the bearer rate of the sheets conveyed at high speed.

The stacking device stacks those sheets taken in from the conveyance route in a temporary storage. When an amount of the stacked sheets reaches predetermined number of sheets, for example, one hundred sheets, they are tied up in a one hundred sheets bundle with a banding band, such as a wrapper band.

Multiple sheets reside simultaneously on the conveyance route, and they are conveyed at a high speed. A destination information set up by the discrimination result obtained by the above-described discriminating device for every sheet is transmitted to a control part, by being continuously shifted during the conveyance of the sheets. That is, in each passing a sensor or a so-called shift-sensor arranged along a conveyance route, the destination information as attributes of the sheets is also transmitted to the control part in accompanying the conveyance of the sheets. As a result, when a sheet is detected by sensor, the destination information which is the attribute of sheets is discriminated. The sheet is then conveyed to the above-described stacking device based on the destination information in every time that the sorting gate is driven.

As is clear from the above description, the sheets are stacked in a last stacking device, by at least the destination information of the sheet is transmitted in the form of shift processing. As described above, since multiple sheets are conveyed along the conveyance route at a high speed and thus the control of the destination information of the sheets is required immediacy, the destination information of the sheets has been conventionally controlled by a single CPU. In order to fill the demand of immediacy, a technique to control only a required minimum control item in the form of shift processing has been used.

On the other hand, in order to respond to diversification of the kind of sheets to be handled, a necessity of executing the shift processing control operation by distributing to multiple CPUs has arisen, and then a measure for the distributing execution has been also been examined. However, only the destination information has been conventionally subjected for the shift processing control operation. Meanwhile, as disclosed in the Japanese Patent Application Publication No. 6-162324, there is known a money receiving and disbursing apparatus which memorizes a quantity of some denomination bills stacked in some bill storage on a conveyance route.

In the prior art apparatus, a sorting gate arranged on an upstream in the conveyance direction of the stacking devices are sorted with destination information using a shift style manner. Thereby, the apparatus does not require bill denomination information of each sheet (money). Therefore, even if a malfunction that a sheet discriminated as a first classification is stacked in a stacking device to stack a second classification, while another sheet discriminated as the second classification is stacked in the stacking device to stack the first classification (so-called "interfusion of each other") has occurred, there is a problem that the malfunction is overlooked.

Furthermore, since the sensing operations of the sensors requires immediacy, it has been configured that the sensing operations of the sensors has been controlled in the form of shift processing with a single CPU. However, in accompanying a growing of the sheet handling apparatus in size, a number of sensors also increase. As a result, the single CPU has failed to complete controls over multiple sensors. Therefore, the shift processing control operation has become to be executed by distributing with multiple CPUs.

Conventionally, in case of executing the shift processing control operation with multiple CPUs, only the information of the last destination of the sheets was made as an attribute of the sheets. Therefore, the information of the stacking device that is capable of controlling and then storing the sheets residing on the conveyance route is only a number of sheets. Therefore, even if disagreement occurred between a number of sheets fed into the apparatus (number of fed sheets) and a number of sheets stacked in the stacking device (number of stacked sheets), there was a problem that look-back reviews of the number of stacked sheets for each classification could not executed.

Furthermore, since the stacking device can not execute controlling and then storing the information regarding classification of the sheets (bills), it was impossible to know the classification of frequently handled bills at a maintenance service. Therefore, there was a problem that an optimal maintenance service corresponding to the frequently handled classification could not be executed.

Furthermore, since a final machine inspection of the number of sheets upon termination of the sheet handling operation is made with only the number of stacked sheets, classification information can not be utilized for the inspection of the number of sheets.

Meanwhile, since the money processor disclosed in the Japanese Patent Application Publication No. 6-162324 fails to have a function of processing the classification information in the form of shift operation, the processor has a drawback that it is impossible to be adapted for a large equipment which comprises multiple conveyance routes.

SUMMARY

An object of the present invention is to provide a sheet handling apparatus and a sheet handling method which is able to recognize occurrence of malfunction.

An aspect of the present disclosure relates to sheet handling apparatus comprising: a first module arranged along a sheet conveyance route from the upstream to the downstream thereof, and a second module arranged adjacent to the first module, wherein the first module including: a take-out part to take out sheets one by one from sheet bundle fed into a supply part; a first conveyance route to convey the taken out sheets with the take-out part; a discriminating device to discriminate classification of the sheets conveyed along the first conveyance route; and a first control part to transmit destination information and classification information of the sheet discriminated by the discriminating device and to execute a conveyance control to the sheet residing along the first conveyance route, and wherein the second module including: a second conveyance route to convey further the sheets conveyed from the first module; a first stacking device to stack the sheet conveyed along the second conveyance route based on the destination information and classification information received from the first module in each classification; and a second control part to execute a conveyance control to the sheet residing along the second conveyance route, and to transmit information of the number of sheets in each classification stacked in the first stacking device, wherein the first control part is configured to execute a cross-check whether the information of the number of sheets in each classification received from the second control part matches with the destination information and the information of the number of sheets transmitted to the second control part or not.

Another aspect of the present disclosure relates to a sheet handling method in the sheet handling apparatus comprising a first module arranged along a sheet conveyance route from the upstream to the downstream thereof, and a second module arranged adjacent to the first module, comprises: taking out sheets one by one from sheet bundle fed to s supply part in the first module sending out the taken-out sheets and conveying the sheets along a first conveyance route; discriminating the classification of the sheet being conveyed; transmitting information of the discriminated classification of the sheet to the second module and then controlling the conveyance of the sheet along the first conveyance route; conveying further the sheet conveyed from the first conveyance route along a second conveyance route in the second module; stacking the sheet conveyed among the second conveyance route in each classification based on the classification information transmitted from the first module controlling the conveyance of the sheet along the second conveyance route, and transmitting information of the number of stacked sheets in each classification to the first module; and executing a cross-check whether the information of the number of sheets in each classification received from the second control part matches with the information of the number of sheets transmitted to the second control part or not.

DETAILED DESCRIPTION

Hereafter, an embodiment of the present invention will be described with reference to the attached drawings, FIGS. 1 to 5.

Figure 1:
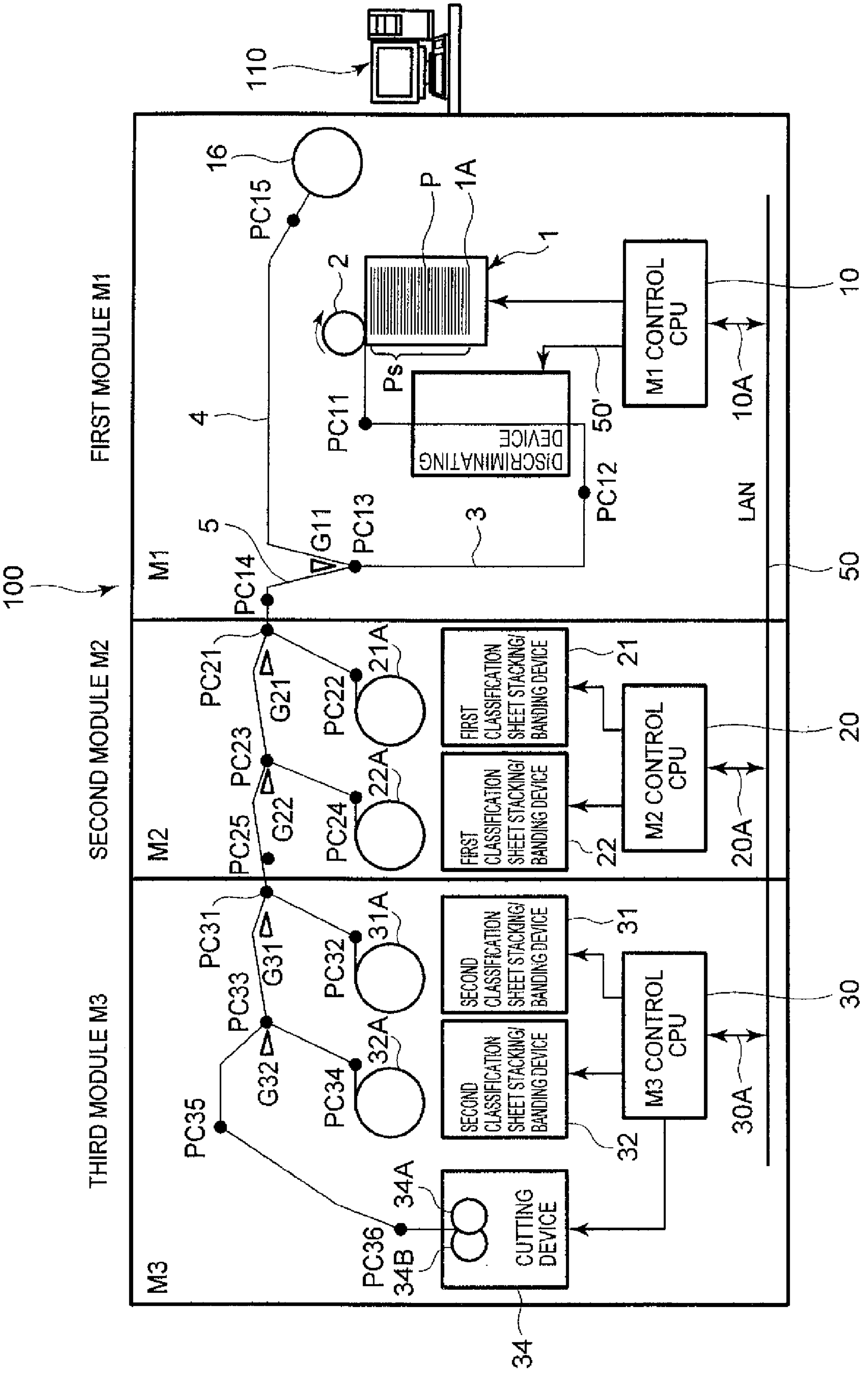
FIG. 1 is a schematic diagram showing the sheet handling apparatus according to the present invention for executing shift processing to the classification information by multiple CPUs.

FIG. 1 is a schematic diagram of the sheet handling apparatus 100 for executing shift processing to the classification information by multiple CPUs according to the present invention.

The sheet handling apparatus 100 sequentially takes out a current uppermost sheet P one by one from sheet bundle input therein in block, for example, a bundle of one thousand sheets, and then conveys them into a discriminating device 6. The sheets are then discriminated their classification in the discriminating devise 6. The sheet handling apparatus 100 sort the sheets based on the discrimination result and then executes operations such as stacking, banding, etc.

In this embodiment, a case of that the sheet handling apparatus 100 is constituted by three modules M1 to M3 will be described.

In this embodiment, conveyance monitoring area is also partitioned to three sections in conformity with the number of modules, for manufacturing and fabrication of the apparatus easy. In this embodiment, although the number of modules constituting the sheet handling apparatus and the number of the conveyance monitoring areas are made equal, the number of modules and the number of the conveyance monitoring area are not necessarily be equal according to the size of the sheet handling apparatus. That is, the sheet handling apparatus may be so constituted that two conveyance monitoring areas are assigned to one module. Or the sheet handling apparatus may be so constituted that two modules are assigned to one conveyance monitoring area. That is, although the size of conveyance monitoring area depends on the processing speed of CPU, the size of module is decided depending on provisions in manufacturing and fabrication. In this embodiment, a case of that the number of conveyance monitoring areas and the number of modules are equal to each other, for convenience of explanation.

The first module M1 is constituted by supply part 1, take-out rotor (take-out part) 2, conveyance route 3, discriminating device 6, rejectable sheet stacking device 16, multiple sensor PC11 to PC15 (first sensors), and sorting gate G11. These structural elements are controlled by first module control CPU 10.

A bundle of sheets, for example, a bundle of one thousand sheets Ps fed to the supply part 1 are loaded on the backup plate 1A. The backup plate 1A is driven with a drive motor (not shown), and raised until the uppermost end of the bundle of the sheets Ps on the backup plate 1A comes to the sheet take-out position of the take-out position of the take-out rotor 2.

When a sheet P residing at the uppermost end of the bundle is raised to the take-out position, the sheet P at the uppermost end of the bundle is detected, and the sheets P coming up to uppermost end of the bundle Ps one after the other in every time that the take-out roller 2 goes into 360-degree roll are sequentially sent out one by one to the conveyance route 3. Therefore, the taken-out sheets P are sent out to the conveyance route 3 at about regular intervals. Meanwhile, the position of the backup plate 1A is controlled by the drive motor of the backup plate 1A so as that the uppermost end sheet P comes to the take-out position.

The sheet P taken out by the take-out rotor 2 is detected the classification and the quality such as physical property, shape, damage, etc. of the sheet P are discriminated by the discriminating device 6. As a result of this discrimination, they are sorted to normal sheets (genuine sheets), defect sheets (mutilated sheets), and sheets impossible to classification discrimination and quality discrimination (rejectable sheets).

As a result of this discrimination, the sheets impossible to classification discrimination and quality discrimination (rejectable sheets) are stacked in the rejectable sheet stacking device 16.

The second module M2 is constituted by the sorting gates G21 and G22 destinations of the sheets based on the discrimination result obtained by the discriminating device 6, and stacking/banding devices for executing stacking and banding to the sheets sorted by the sorting gates G21 and G22. In this embodiment, the stacking/banding devices 21 and 22 stack therein the sheets discriminated as genuine ones of the first classifications.

Along the conveyance route in the second module M2, multiple sensors PC21 to PC25 (second sensors) monitoring sheets conveyed in the second module M2.

As a result of discrimination by the discriminating device 6, the sheets P discriminated as genuine sheets or mutilated sheets by the sorting gate G11 are sorted to left-hand side. While the sheets P discriminated as sheets impossible to classification discrimination and quality discrimination (rejectable sheets) are sorted to right-hand side.

In case of that the sheet P sorted by the sorting gate G11 is a genuine one of the first classification, they are conveyed further to the stacking/banding device 21 by the sorting gate G21. The sheets P conveyed to the stacking/banding device 21 are stacked in a temporary storage of the stacking/banding device 21. When the number of the stacked sheets P reaches one hundred, they are moved to a banding device and banded therein. Then a bundle of one hundred genuine sheets is formed.

When the number of the sheets stacked in the temporary storage of the stacking/banding device 21 reaches one hundred, sorting gate G22 is driven to sort sheets conveyed following the former one hundred sheets to stacking/banding device 22 if the following sheets are genuine ones of the first classifications. Like this, during the genuine ones of the first classifications are being stacked in the temporary storage of stacking/banding device 22, the sheets of one hundred sheets already stacked in the temporary storage of stacking/banding device 21 are banded by the banding device of stacking/banding device 21 as described above. Then a bundle of one hundred sheets is formed by the banding device.

When the number of the sheets stacked in the temporary storage of stacking/banding device 22 reaches one hundred, still further sheets conveyed following the sheets already stacked in the stacking/banding device 22 are stacked in the temporary storage of the other stacking/banding device 21. Then a bundle of one hundred sheets is formed by the banding device of the stacking/banding device 21.

In case of that sheets are discriminated as the second classification ones by the discriminating device 6, sheet handling the same as that executed by stacking/banding devices 21 and 22 are executed by stacking/banding devices 31 and 32 in module M3.

The module M3 is provided with stacking/banding devices 31 and 32 for stacking sheets discriminated as second classifications by the discriminating device 6. Furthermore, the module M3 is provided with sorting gate G31 and G32 assigned to the stacking/banding devices 31 and 32 for stacking the second classifications, and sensors PC31 to PC36.

Sheets discriminated as mutilated sheets (nonnegotiable sheets) by the discriminating device 6 is conveyed to cutting device 34.

In the cutting device 34, first cutter blade 34A in which multiple discoidal cutting blades are mounted to a rotating shaft and second cutter blade 34B having a constitution the same as that of the first cutter blade 34A are provided in a nested state with each other. The first and second cutter blades 34A and 34B rotate in keeping contact with each other, and cut mutilated sheets conveyed thereto.

Figure 2:
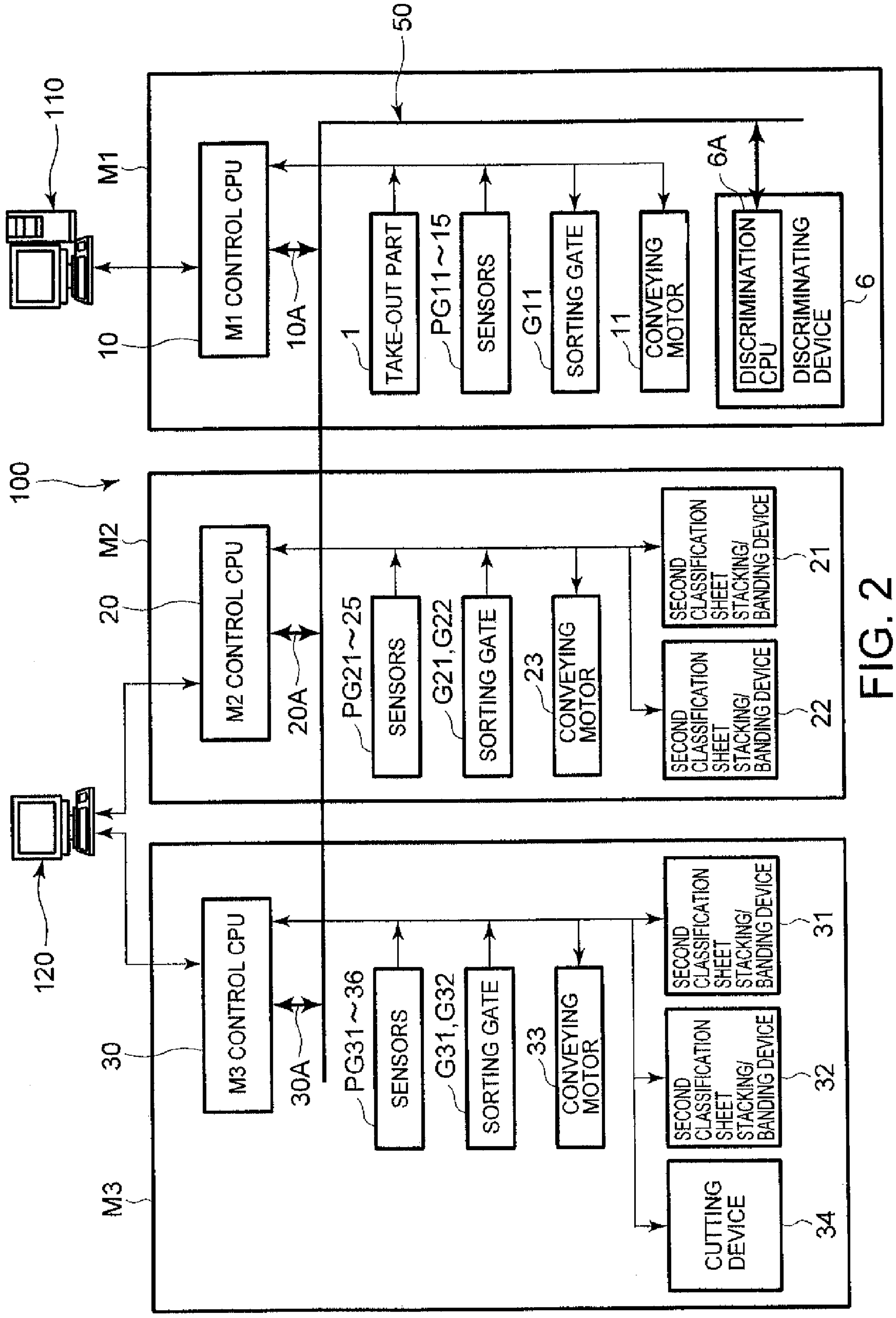
FIG. 2 is a block diagram illustrating the shift processing control operation by multiple CPUs in one embodiment of the present invention.

FIG. 2 is a block diagram illustrating the shift processing control operation by multiple CPUs in one embodiment of the present invention.

The first module M1 is provided with discrimination CPU 6A which constitutes first module control CPU 10 for controlling the whole of the first module M1 and discrimination CPU 6A. The first module control CPU 10 and the discrimination CPU 6A are connected to LAN (Local Area Network) 50.

To the first module control CPU 10, the supply part 1, the sensors PC11 to PC15, the sorting gate G11, and a conveying motor (not shown) are connected. Thereby those elements are controlled by the first module control CPU 10.

The second module M2 is provided with second module control CPU 20 for controlling the whole of the second module M2. The second module control CPU 20 is then connected to the LAN 50.

To the second module control CPU 20, the stacking/banding devices 21 and 22, the sensors PC21 to PC25, the sorting gates G21 and G22, and a conveying motor (not shown) are connected. Thereby those elements are controlled by the second module control CPU 20.

The third module M3 is provided with third module control CPU 30 for controlling the whole of the third module M3. The third module control CPU 30 is then connected to the LAN 50.

To the third module control CPU 30, the stacking/banding devices 31 and 32, the sensors PC31 to PC36, the sorting gates G31 and G32, a conveying motor (not shown), and the cutting device 34 are connected. Thereby those elements are controlled by the third module control CPU 30.

As described above, the first module control CPU 10, the second module control CPU 20, the third module control CPU 30, and the discrimination CPU 6A are mutually connected by the LAN 50.

The second module control CPU 20 and the third module control CPU 30 are connected further to maintenance service CPU 120 via USB interface. According to this connection, stacking information stored in the second module control CPU 20 and the third module control CPU 30 can be called up.

Herein now, conveyance control operation for the sheet P by sensors according to the present embodiment will be described.

A bundle of one thousand sheets Ps is loaded in block on the backup plate 1A of the supply part 1, and taken-out of the sheets in the block is started. At the start of sheet taking-out operation, the backup plate 1A goes up. Then the sheets P are taken out one by one from the take-out rotor 2 and sent out to the conveyance route 3. The sheet P sent out to the conveyance route 3 is conveyed by the above-described manner, and discriminated by the discriminating device 6. Until the sheets P are sorted and then stacked and further a bundle of one hundred sheets is formed, the operations are as noted above.

Now, one example of the conveyance operation of the sheet handling apparatus 100 constituted as described above will be described in reference to FIGS. 3 and 4.

Figure 3:
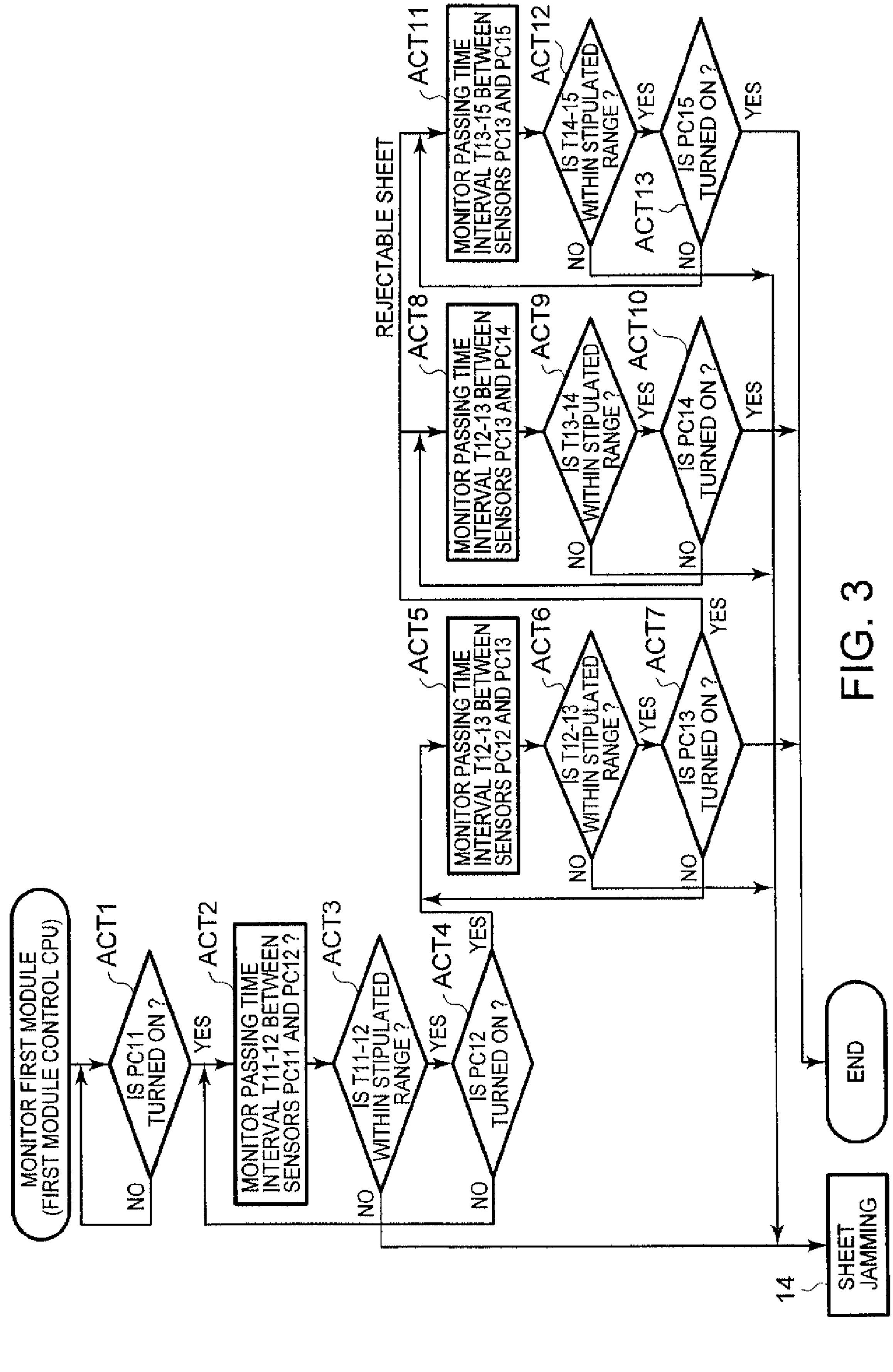
FIG. 3 is a flow chart illustrating an operation of the first module constituting the sheet handling apparatus of the present invention.

FIG. 3 is a flow chart illustrating actions executed in the first module M1 constituting the sheet handling apparatus 100. When the sheet P is sent out to the conveyance line 3 by the take-out rotor 2, the sheet P is detected by sensor PC11 (ACT1). The detected sheet P is discriminated by the discriminating device 6. Then a time interval "T11 ·12" until it reaches sensor PC12 from sensor PC11 is measured (ACT2). This time interval "T11·12" means the time that the sheet P passes the space between the sensors PC11 and PC12.

Therefore, the measurement of the passing time interval "T11·12" is made by measuring the time interval from the time that the sensor PC11 turned ON to the time that the sensor PC12 turned ON, in every time, for example 200 μsec. This measurement can be made by taking advantage of interrupt timer of the first module control CPU 10 for controlling the first module M1. Or the measurement can be made by a hardware timer (not shown) which is externally controlled by the first module control CPU 10.

The admissibility of the passing time length is judged by the Equation (I) as shown below. As a result of judgment by the Equation I, if the passing time length is within a stipulated range, the passing time length is judged as normal (ACT4; "Yes").

$$(T11\cdot12-\Delta T)\leqq T11\cdot12\geqq(T11\cdot12+\Delta T) \qquad \text{(I)}$$

Here, "T11·12" represents the interval between the times the sheet P passes the sensors PC11 and PC12. "ΔT" represents Tolerance.

On the other hand, in case of that the passing time interval "T11·12" departs from the stipulated range shown in the Equation (I) (ACT3; "No"), it is judged an occurrence of sheet jamming (ACT14).

In ACT4, if the sheet P is detected by sensor PC12 (ACT4; "Yes"), passing time interval "T12·13" between the times that the sheet P passes through sensors PC12 and PC13 is measured (ACT5). This passing time interval "T12·13" are checked by the Equation (I). If the passing time interval "T12·13" is within the stipulated range, the passing time length is judged as normal (ACT7, "Yes").

On the other hand, if the passing time interval "T12·13" departs from the stipulated range (ACT6; "No"), it is judged an occurrence of sheet jamming (ACT14).

In a similar way as described above, if passing time interval "T13·14" between the times that the sheet P passes through sensors PC13 and PC14 (ACT8) and the discrimination result by the discriminating device 6 indicates that the sheet P is rejectable sheet, passing time interval "T13·15" between the times that the sheet P passes through sensors PC13 and PC15 is also measured (ACT11).

If the result of measurement is within stipulated range, the passing time interval is judged as normal (ACT9; "Yes" or ACT12; "Yes"). If the result of measurement departs from the stipulated range, it is judged an occurrence of sheet jamming (ACT9; "No" or ACT12; "No").

Figure 4:
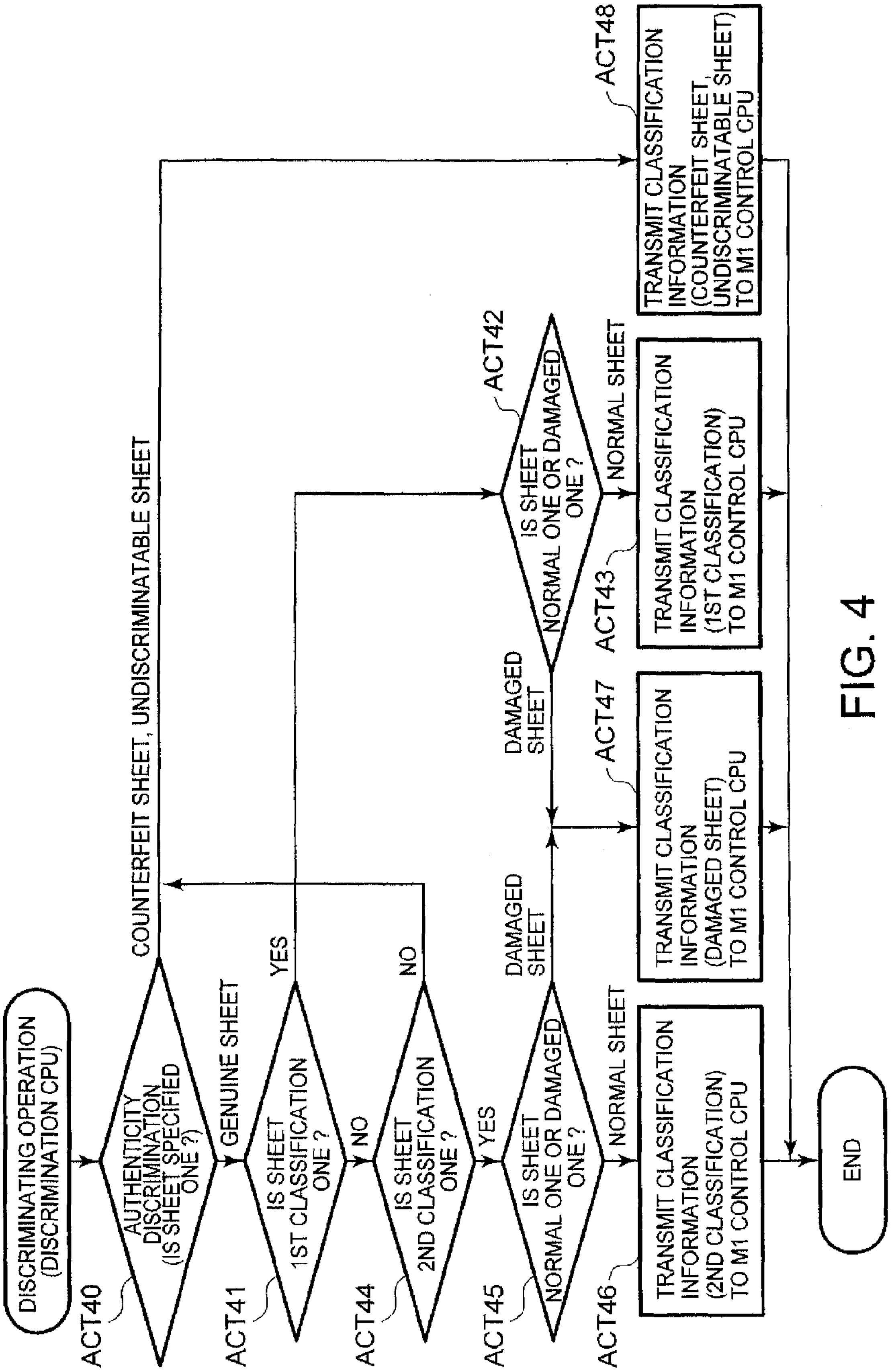
FIG. 4 is a flow chart illustrating an operation of the discriminating device 6 provided in the first module constituting the sheet handling apparatus of the present invention.

FIG. 4 is a flow chart illustrating an operation of the discriminating device 6 provided in the first module M1 which constitutes the sheet handling apparatus 100 of the present invention. The operation of the discriminating device 6 is executed by discrimination CPU 6A.

The operation is executed by discrimination CPU 6A in parallel to the conveying operation of the first module M1 which is controlled by the first module control CPU 10.

The discriminating device 6 is constituted by multiple detection parts, such as shape detection part, reflected light detection part, transmitted light detection part, magnetism detection part, fluorescence detection part, and thickness detection part, etc. The discriminating device 6 executes classification discrimination, destination discrimination, authenticity discrimination, and normal sheet/damaged sheet discrimination, by integrating the detection results of the multiple detection parts.

At the beginning, the discriminating device 6 executes authenticity (genuine/counterfeit) discrimination of sheet detected by each of the above-described detection parts (ACT40). In the authenticity discrimination, primarily physical property of the sheet as a medium to be detected is discriminated.

If the sheet is discriminated as genuine one (ACT40; "genuine sheet") as a result of the authenticity discrimination, the discriminated sheet is further discriminated whether the sheet is first classification or not (ACT41).

In case of that the sheet is judged as the first classification as a result of discrimination, the sheet is further discriminated whether the sheet is normal sheet or damaged sheet (ACT42). In case of that the sheet is discriminated as normal as the result of discrimination (ACT42; "normal sheet"), the discriminating device 6 gives notice of that the sheet is normal one of the first classification to the first module control CPU 10 (ACT43).

In ACT42, if the sheet is discriminated as damaged sheet (ACT42; "damaged sheet"), the discriminating device 6 gives notice of that the sheet is damaged one of the first classification to the first module control CPU 10 (ACT47).

Next, in ACT41, if it is discriminated that the sheet is not the first classification (ACT41; "No"), it is discriminated that the sheet is second classification or not (ACT44). In case of that the sheet is judged as the second classification as a result of discrimination (ACT44; "Yes"), the sheet is further discriminated whether the sheet is normal sheet or damaged sheet (ACT45). In case of that the sheet is discriminated as normal as the result of discrimination (ACT45; "normal sheet"), the discriminating device 6 gives notice of that the sheet is normal one of the second classification to the first module control CPU 10 (ACT46).

Next, if the sheet is discriminated as damaged sheet as a result of discrimination in ACT42 (ACT42; "damaged sheet") or the sheet is discriminated as damaged sheet as a result of discrimination in ACT45 (ACT45; "damaged sheet"), the discriminating device 6 gives notice of that the respective sheets are damaged ones of the first classifications to the first module control CPU 10 (ACT47).

Next, if the sheet is discriminated as being distinctly counterfeit sheet in the authenticity discrimination in ACT40 (ACT40; "counterfeit sheet/undiscriminatable sheet"), or if it is discriminated that the sheet is not the second classification in ACT44 (ACT33; "No"), the discriminating device 6 gives notice of that the sheet is counterfeit sheet or undiscriminatable sheet to the first module control CPU 10 (ACT48).

The first module control CPU 10 receives the discrimination result by the discriminating device 6, and then decides stacking place which is the destination of the sheet based on the discrimination result.

That is, the first module control CPU 10 changes the sorting gate G11 based on the discrimination result. Therefore, the sorting gate G11 is changed so as that the sheet P discriminated as genuine sheet or mutilated sheet is conveyed to the module M2 or the M3 module M3. On the other hand, the gate G11 is changed so as that the sheets discriminated as "counterfeit sheet or undiscriminatable sheet" are handled as rejectable sheet, so that they are conveyed toward the rejectable sheet stacking device 16 provided in the first module M1.

Figure 5:
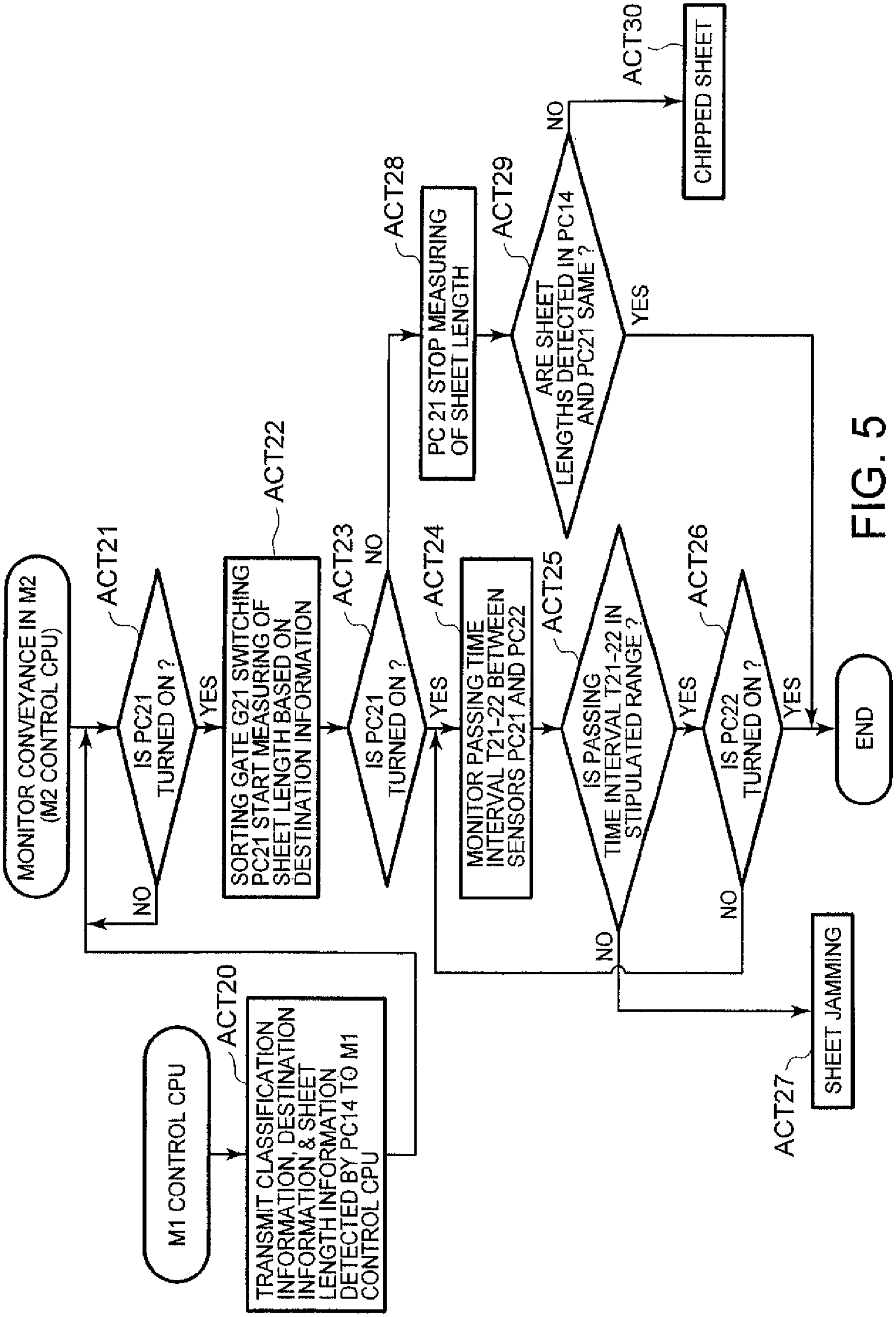
FIG. 5 is a flow chart illustrating a conveyance operation of the second module constituting the sheet handling apparatus of the present invention.

FIG. 5 is a flow chart illustrating operations of the module M2 constituting the sheet handling apparatus 100 of the present invention. Second module M2 is provided with stacking/banding devices 21 and 22 for stacking and banding normal ones of the first classifications. Third module M3 is provided with stacking/banding devices 31 and 32 for stacking and banding normal ones of the second classifications. However, since the basic operation is common, operations of the stacking/banding devices 21 and 22 will be described, but descriptions of portions in the stacking/banding devices 31 and 32 which are common to those in the stacking/banding devices 21 and 22 will be omitted.

In this embodiment, the first module control CPU 10 of the first module M1 and the second module control CPU 210 of the second module M2 are connected by the LAN 50. Therefore, classification information and destination information based on the discrimination result of the discriminating device 6 in the first module M1, destination information, and sheet length information by sensor PC14 are noticed to the second module control CPU 20 of the second module M2 from the first module control CPU 10 through LAN 50 (ACT20). Based on these information, the conveyance control operation by multiple CPUs will be described.

The sheet P conveyed to the second module M2 is detected by sensor PC21 (ACT21).

Second module control CPU 20 controls the sorting gates G21 and G22 based on the classifications information and the destination information which were received from first module control CPU 10, and conveys the sheets to the stacking/banding device 21 or the stacking/banding device 22 set up for every classification. For example, in case of that the classifications discriminated with the discriminating device 6 is a genuine one of the first classifications, the discriminating device 6 controls the sorting gate G21 so as to convey the classifications to stacking/banding device 21. That is, every time that a sheet is detected by a sensor and then conveyed upstream from downstream of the conveyance route, the classification information and the destination information are transmitted to the control part as attributes of the sheets by being executed shift processing. Although conventionally only a destination information was executed shift processing, the present invention is characterized by that classification information and destination information are executed shift processing.

This shift processing is also executed in case of that the sheets are conveyed from the first module M1 to the second module M2 and a case of that the sheets are conveyed from the second module M2 to the third module M3 as described later. As a result of this shift processing, even if destinations differ for every classification of sheets, stacking to each stacking/banding device becomes possible.

As a result, in case of that a sheet conveyed to stacking/banding device 21 is detected by sensor PC22, the stacked number of the first classifications is up-counted. That is, the number of sheets actually conveyed to stacking/banding device assigned to the first classifications is calculated (counted number C1).

This result of counting (counted number C1) is transmitted to first module control CPU 10 from second module control CPU 20 through LAN 50.

In first module control CPU, the number of sheets to be stacked in stacking/banding device 21 is calculated based on the above-described classification information of the sheets (counted number C2).

Next, first module control CPU 10 cross-checks the counted number C1 and the counted number C2 which were received from second module control CPU. According to the cross-check, destination information is set up based on the classification information discriminated by the discriminating device 6. When interfusion of the sheets has occurred, the occurrence of intrusion malfunction can be recognized by checking whether the sheet has been conveyed to the stacking device based on the destination information. Furthermore, according to the cross-check, if destinations of multiple sheets residing between the discriminating device 6, and stacking/banding device are different, it is confirmed that the control of the sheets with shift processing has been surely executed.

Although a case where the sheets conveyed to stacking/banding device is detected by sensor PC22 has been described above, the present invention is not limited to the case. For example, there is another way of detecting that sheet was actually taken into the impeller 21A by sensor (not shown) which detects that the sheets was taken into the impeller 21A. However, since the general meaning of the present invention is not limited to the detection manner of the sheets taken into the impeller 21A, the detailed explanation of the detection manner is omitted.

Further, in response to the thing that sensor PC21 is turned ON, the sheet length measurement by sensor PC21 is started. Specifically, the time length of that the sensor PC21 is turned ON is calculated by counting predetermined cycle clocks, for example, 200 microseconds cycle clocks (ACT22).

Further, passing time interval T21·22 until sheet reaches sensor PC22 from sensor PC21 is monitored (ACT24). As a result of this monitoring, passing time interval T21·22 is verified likely by the Equation I. If the passing time interval is within stipulated range, it will be judged normal (ACT25; "Yes").

On the other hand, in case of that passing time interval T21·22 departs from the stipulated range (ACT25; "No"), it is judged an occurrence of sheet jamming (ACT26).

In ACT23, if OFF state of sensor PC21 is detected (No of ACT23), the sheet length measurement by sensor PC21 stops, and the sheet length measurement by sensor PC21 is started from the time that the sheet P passes sensor PC21 (ACT28). The sheet length measured by the above-described manner and the sheet length noticed from the first module control CPU 10 are judged whether the same or not (ACT29).

On this occasion, the sheet length measured by sensor PC14 which is a sensor resting on the most downstream position of the conveyance route in the first module M1 of the nearest conveyance route is used. This depends on provision for being able to deem that the conveyance route is continued when results of sheet length measurements according to sensors near the connecting region of different modules are same. That is, the sheet length information transmitted from first module control CPU 10 which is a CPU arranged in upstream module and the sheet length information measured in the second module M2 are compared with each other, and then based on the comparison result a chipped sheet is discriminated. Here, the chipped sheet means a sheet which is partially missing. Therefore, in this embodiment, sheet length is discriminated by comparing measurement results of sensors PC14 and PC21 arranged near the connecting region between the first module M1 and the second module M2 (ACT29).

At a time of measuring sheet length, on occasion when the sheet length discriminated by the sensor PC21 is short in compared to the sheet length discriminated by the sensor PC14, the sheet is judged as chipped sheet (ACT30).

As described above, in this embodiment of the present invention, the sheet handling apparatus is compartmented to modules to the extent possible of controlling conveyance by single CPU even if the apparatus grows in size and the conveyance line increases in length. Each module is connected by LAN and the length of the conveyed sheet P is measured by module located on the upstream of the conveyance route. Thus, conveyance control for the sheet P becomes possible to executed by multiple CPUs, even in the occasion that the sheet P is conveyed through multiple modules by transmitting the data of sheet length of the sheet P as sheet length information to following module.

On occasion of increasing sheet classification to be handled, the above-described embodiment can be installed further the module M4 in between the module M2 and the module M3. Since CPUs are equipped in each module, conveyance controllability is equivalent to that in the case of that the module M2 is not equipped.

Even in this case, since the conveyance control is executed in similar to the way of conveyance control in the first module control CPU 10 and the second module control CPU 20.

The third module control CPU 30 counts the number of sheets (counted number C3) practically conveyed to each stacking/banding device in every classification by changing over the sorting gates G11-G32, based on the sheet length information and the classification information transmitted from the first module control CPU (first control part) 10.

The third module control CPU 30 transmits the counted number C3 to the first module control CPU 10.

The first module control CPU 10 cross-checks whether the counted number C3 received from the third module control CPU 30 coincides the number counts in every classification transmitted to the third module control CPU 30. As a result of this cross-check, if the discrimination results has agreed, this agreement shows that the sheet handling is executed normally.

As described above, in case of more module is installed, classification information and destination information are transmitted to the control CPU in each module through the LAN.

Control CPU of each module controls the conveyance of the sheet to be conveyed to the stacking/banding device in each module, counts the number of sheets practically conveyed into the stacking/banding device in each module, and then transmits the count to the first module control CPU 10.

The first module control CPU 10 becomes to cross-check whether the count of every classification received from the control CPU in each module through the LAN coincides the number of sheets transmitted to each module.

As described above, even if the system is large and executes a conveyance control with multiple CPUs, the sheet handling apparatus and handling method of the present invention, is able to obtain an effect similar to that as if executing the conveyance control by single CPU, by the classification information and destination information are transmitted from the first module control CPU to the second module control CPU. Furthermore, since the classification information is transmitted as attribute incidental to the destination information of the sheets subjected to detection thereto, malfunction of interfusion of sheets to each other, etc. can be prevented.

What is claimed is:

1. A sheet handling apparatus comprising:

a first module arranged along a sheet conveyance route from the upstream to the downstream thereof, and a second module arranged adjacent to the first module, wherein the first module including:

a take-out part to take out a sheet one by one from a sheet bundle fed into a supply portion;

a first conveyance route to convey the taken out sheet from the take-out part;

a discriminating device to discriminate classification of the sheet conveyed along the first conveyance route; and a first control part to transmit destination information and classification information of the sheet discriminated by the discriminating device and to execute a conveyance control to the sheet residing along the first conveyance route, and wherein the second module including:

a second conveyance route to convey further the sheets conveyed from the first module;

a first stacking device to stack the sheet conveyed along the second conveyance route based on the destination information and classification information received from the first module in each classification; and a second control part to execute a conveyance control to the sheet residing along the second conveyance route, and to transmit information of the number of sheets in each classification stacked in the first stacking device, wherein the first control part is configured to execute a cross-check whether the information of the number of sheets in each classification received from the second control part matches with the destination information and the information of the number of sheets transmitted to the second control part or not.

2. The apparatus as claimed in claim 1, wherein the discriminating device is configured to discriminate further the quality state of the sheet, and the first control part is configured to discriminate whether the sheet is a genuine sheet or a rejectable sheet.

3. The apparatus as claimed in claim 2 further comprising:

a first sorting gate to convey the sheet discriminated as the genuine sheet to the second module and to convey the sheet discriminated as the rejectable sheet to a rejectable sheet stacking device provided in the first module.

4. The apparatus as claimed in claim 1 further comprising:

a first sensor provided along the first conveyance route to measure the length of the sheet conveyed along the first conveyance route, wherein the first sensor is configured to transmit the information of the sheet length measured by the first sensor to the first control part.

5. The apparatus as claimed in claim 4, wherein the first control part is configured to transmit the information of the sheet length received from the first sensor to the second control part.

6. The apparatus as claimed in claim 5 further comprising:

a second sensor provided along the second conveyance route to measure the length of the sheet conveyed along the second conveyance route, wherein the second control part is configured to compare the information of the sheet length received from the first control part with the information of the sheet length measured by the second sensor.

7. The apparatus as claimed in claim 3 further comprising:

a second sorting gate provided in the second module to sort the genuine sheet conveyed to the second module based on the classification discriminated by the first module.

8. The apparatus as claimed in claim 7, wherein the first stacking device is configured to stack the sheets sorted by the second sorting gate in each classification.

9. The apparatus as claimed in claim 8, wherein the first stacking device has a banding function to band a sheet bundle stacked in each classification.

10. The apparatus as claimed in claim 9 further comprising:

a third module lying adjacent to the second module, wherein the first control part transmits information of the number of sheets in each classification discriminated by the first module further to the third module, the third module including a third sorting gate to sort the sheets based on the information of classification received from the first control part of the first module.

11. The apparatus as claimed in claim 10, wherein the third module further including a second stacking device to stack sheets sorted by the third sorting gate.

12. The apparatus as claimed in claim 11, wherein the second stacking device has a banding function to band a sheet bundle in each classification.

13. The apparatus as claimed in claim 11, wherein the third module further including:

a third control part to transmit information of the number of sheets stacked in the second stacking device in each classification to the first control part, and wherein the first control part is configured to execute a cross-check whether the information of the number of sheets stacked in the second stacking device in each classification received from the third control part matches with the information of the number of sheets transmitted to the third control part or not.

14. A sheet handling method in a sheet handling apparatus comprising a first module arranged along a sheet conveyance route from the upstream to the downstream thereof, and a second module arranged adjacent to the first module, the method comprising:

conveying a sheet taken out along a first conveyance route in the first module;

discriminating the classification of the sheet being conveyed;

transmitting information of the discriminated classification of the sheet to the second module and controlling the conveyance of the sheet along the first conveyance route;

conveying further the sheet conveyed from the first conveyance route along a second conveyance route in the second module;

stacking the sheets conveyed along the second conveyance route in each classification based on the classification information transmitted from the first module;

controlling the conveyance of the sheet along the second conveyance route, and transmitting information of the number of stacked sheets in each classification to the first module; and executing a cross-check whether the information of the number of sheets in each classification received from the second control part matches with the information of the number of sheets transmitted to the second control part or not.

15. The method as claimed in claim 14, wherein the discriminating in the first module further discriminating the quality state of the sheet, and discriminating whether the sheet is a genuine sheet or a rejectable sheet.

16. The method as claimed in claim 14 further comprising:

sorting the sheet discriminated as the genuine sheet in the first module to the second module with a first sorting gate, and conveying the sheet discriminated as the rejectable sheet to a rejectable notes stacking device.

17. The method as claimed in claim 14 further comprising:

measuring the sheet length conveyed along the first conveyance route, and transmitting information of the measured length of the sheet to the first module.

18. The method as claimed in claim 17, further comprising:

transmitting the information of the length of the sheet from the first module to the second module.

19. The method as claimed in claim 18 further comprising:

measuring the length of sheet conveyed along the second conveyance route; and comparing the information of the sheet length received from the first module with the information of the sheet length measured in the second module.

20. The method as claimed in claim 16 further comprising:

sorting the genuine sheet conveyed to the second module based on the classification discriminated by the first module with a second sorting gate.

* * * * *